(12) United States Patent
Kim et al.

(10) Patent No.: US 8,072,430 B2
(45) Date of Patent: Dec. 6, 2011

(54) TOUCH SCREEN DISPLAY APPARATUS AND METHOD OF DRIVING THE SAME

(75) Inventors: Dong-gyu Kim, Yongin-si (KR); Seung-soo Baek, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1196 days.

(21) Appl. No.: 11/769,335

(22) Filed: Jun. 27, 2007

(65) Prior Publication Data

US 2008/0018613 A1 Jan. 24, 2008

(30) Foreign Application Priority Data

Jul. 18, 2006 (KR) .................. 10-2006-0066944

(51) Int. Cl.
*G06F 3/041* (2006.01)
(52) U.S. Cl. .................. 345/173; 345/174
(58) Field of Classification Search .......... 345/173–175, 345/87; 178/18.01–18.09; 349/12, 23, 24, 349/41, 42, 149
See application file for complete search history.

(56) References Cited

U.S. PATENT DOCUMENTS

| | | | |
|---|---|---|---|
| 2003/0086046 A1* | 5/2003 | You | 349/149 |
| 2006/0017710 A1* | 1/2006 | Lee et al. | 345/173 |
| 2006/0077186 A1* | 4/2006 | Park et al. | 345/173 |
| 2006/0262099 A1* | 11/2006 | Destura et al. | 345/173 |
| 2007/0070047 A1* | 3/2007 | Jeon et al. | 345/173 |

* cited by examiner

*Primary Examiner* — Amare Mengistu
*Assistant Examiner* — Hong Zhou
(74) *Attorney, Agent, or Firm* — Innovation Counsel LLP

(57) ABSTRACT

A touch screen display apparatus and a method of driving the same in which the touch screen display apparatus includes a first transparent substrate, a gate line and a sensor conductor formed on the first transparent substrate, a data line insulated from and intersecting the gate line and sensor conductor, a second transparent substrate facing the first transparent substrate, and a sensor electrode formed on the second transparent substrate so as to correspond to an intersection of the sensor conductor and the data line, the sensor electrode electrically connecting the sensor conductor with the data line when acted upon by an external pressure.

7 Claims, 15 Drawing Sheets

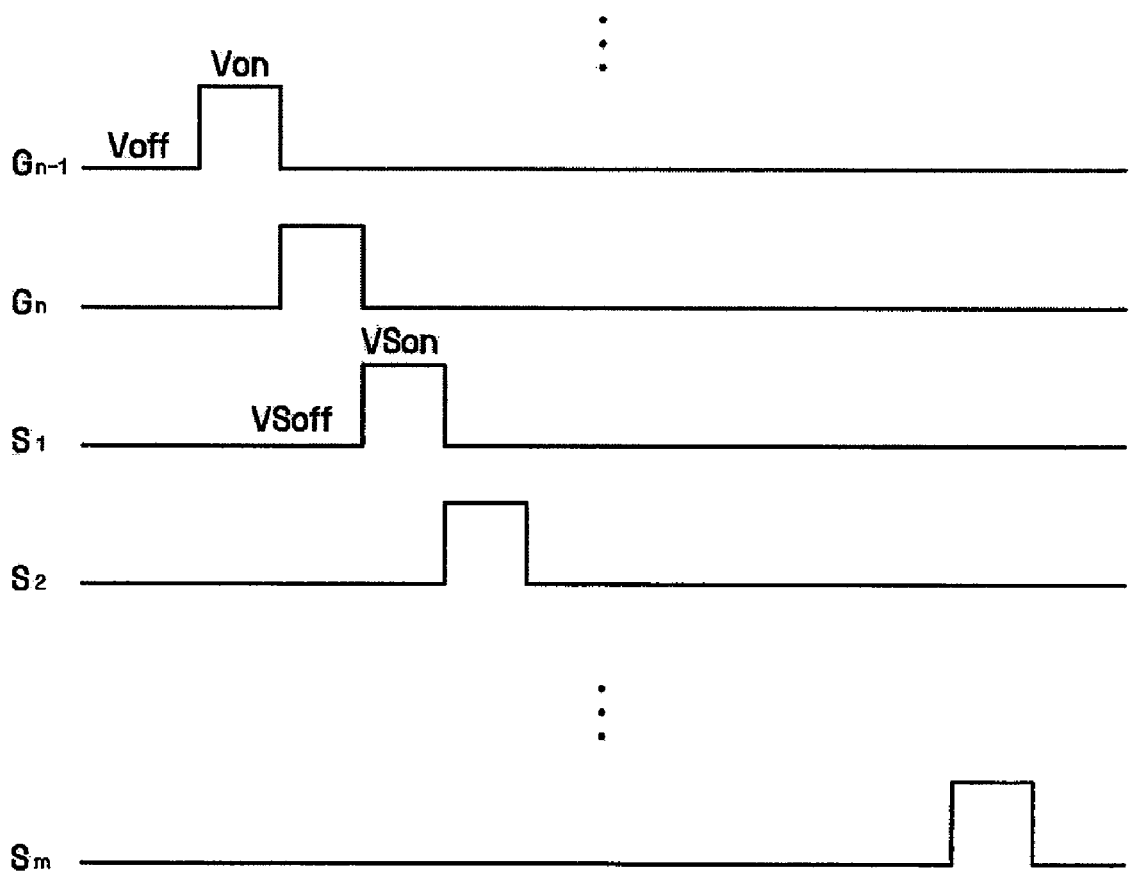

TOUCH SCREEN DISPLAY APPARATUS AND METHOD OF DRIVING THE SAME

This application claims priority of Korean Patent Application No. 10-2006-0066944 filed on Jul. 18, 2006, and all the benefits accruing therefrom under 35 U.S.C. §119, the entire contents of which are herein incorporated by reference.

BACKGROUND OF THE INVENTION

1. Field of the Invention

The present invention relates to a display apparatus having a touch screen and a method of driving the same.

2. Description of the Related Art

Touch screen displays can be used in place of a conventional keyboard or mouse for data entry. A touch panel, once installed on a liquid crystal panel, allows a user to execute desired operations by touching displayed objects. A touch screen display apparatus can be used in combination with computer-based training and simulated applications, office automation fields, education applications, game applications, and so on.

A conventional touch screen display apparatus is basically constructed of a liquid crystal panel, a touch panel attached to the liquid crystal panel, a controller, a device driver, and application software. The liquid crystal panel includes two plates having a plurality of electrodes and a liquid crystal layer interposed between the two plates. Voltages applied to the electrodes rearrange the liquid crystal molecules to control light transmittance and display images.

A touch panel affixed to an LCD apparatus comprises a pair of substrates facing each other, upper and lower conductive layers formed on the substrates, and a plurality of dot spacers interposed between the pair of substrates. If a user touches a particular position on the touch panel, the upper and lower conductive layers come into contact at the particular position so as to be electrically connected, thereby allowing position information to be identified.

The conventional touch screen display apparatus having a separate touch panel attached to the liquid crystal panel is bulky and not easy to use while in motion. Accordingly, a touch screen display apparatus that is light in weight and small in size would be desirable.

SUMMARY OF THE INVENTION

According to one aspect, the present invention provides a touch screen is display apparatus that is light in weight and small in size includes a first transparent substrate, a gate line and a sensor conductor formed on the first transparent substrate, a data line insulated from and intersecting the gate line and sensor conductor, a second transparent substrate facing the first transparent substrate, and a sensor electrode formed on the second transparent substrate so as to correspond to an intersection of the sensor conductor and the data line and electrically connecting the sensor conductor with the data line when acted upon by an external pressure.

According to another exemplary embodiment of the present invention, a touch screen display includes a liquid crystal panel including a plurality of gate lines and a plurality of sensor conductors extending in a first direction, a plurality of data lines extending in a second direction, and a sensor electrode electrically connecting the sensor conductors with the data lines when pressure is applied to the liquid crystal panel, a gate driver connected to the gate lines and sequentially applying a gate driving signal to the gate lines, a sensor signal generator including a shift register connected to the sensor conductors that sequentially applies a sensor driving signal to the sensor conductors, and an integrated data driver applying a data voltage to the data lines for sensing the sensor driving signal transmitted from the data lines.

BRIEF DESCRIPTION OF THE DRAWING

The above and other features and advantages of the present invention will become more apparent by describing in detail preferred embodiments thereof with reference to the attached drawings, in which:

FIG. 18 is a timing diagram illustrating a modified example of the operation shown in FIG. 17.

DETAILED DESCRIPTION OF THE INVENTION

It will be understood that when an element is referred to as being "on" another element, it can be directly on the other element or intervening elements may be present there between. In contrast, when an element is referred to as being "directly on" another element, there are no intervening elements present. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

For convenience of explanation, the present invention will be explained with regard to a TN mode touch screen display apparatus, however it should be understood that the principles hereof are also applicable to liquid crystal molecules arranged in various other modes, including Twisted Nematic (TN) mode, Optically Compensated Birefringence (OCB) mode, Dual Field Switching (DFS) mode, Fringe Field Switching (FFS) mode, In-Plane Switching (IPS) mode, Patterned Vertical Alignment (PVA) mode, and so on.

Figure 1:
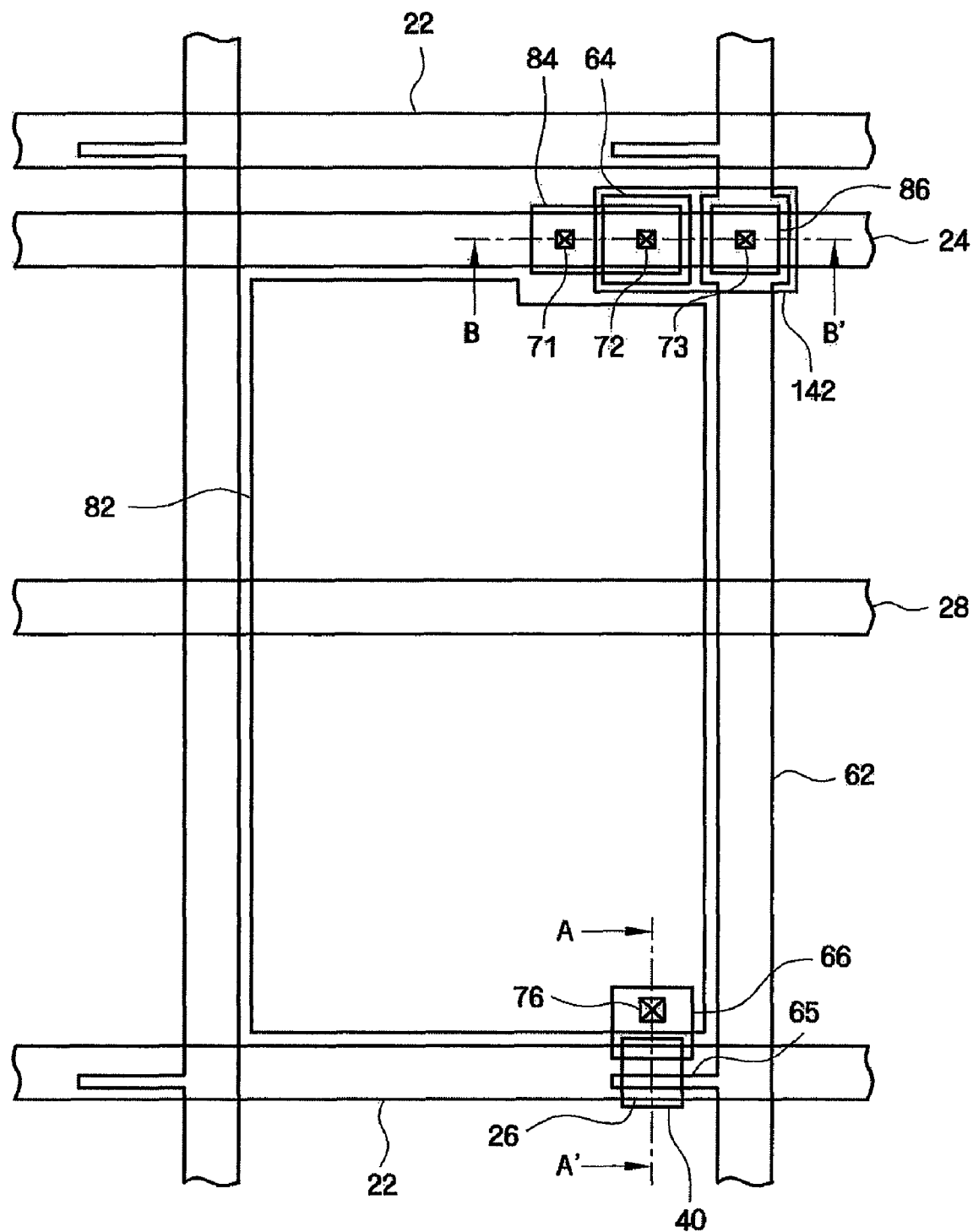
FIG. 1 is a layout diagram of a touch screen display apparatus according to an embodiment of the present invention.
Figure 2:
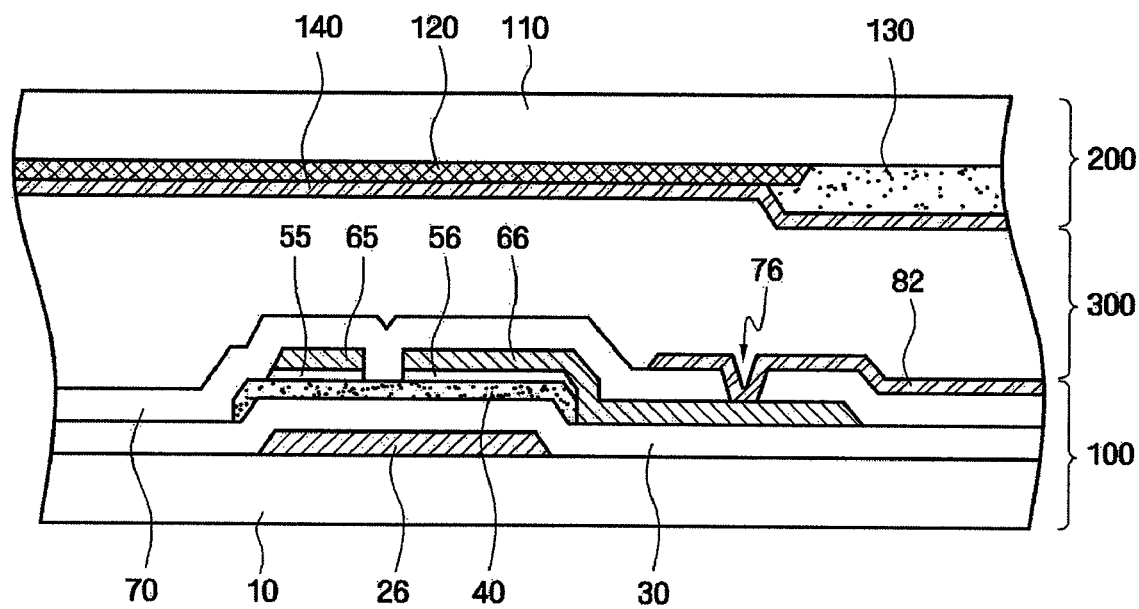
FIG. 2 is an exploded cross-sectional view of the touch screen display apparatus, taken along the line A-A' in FIG. 1.
Figure 3:
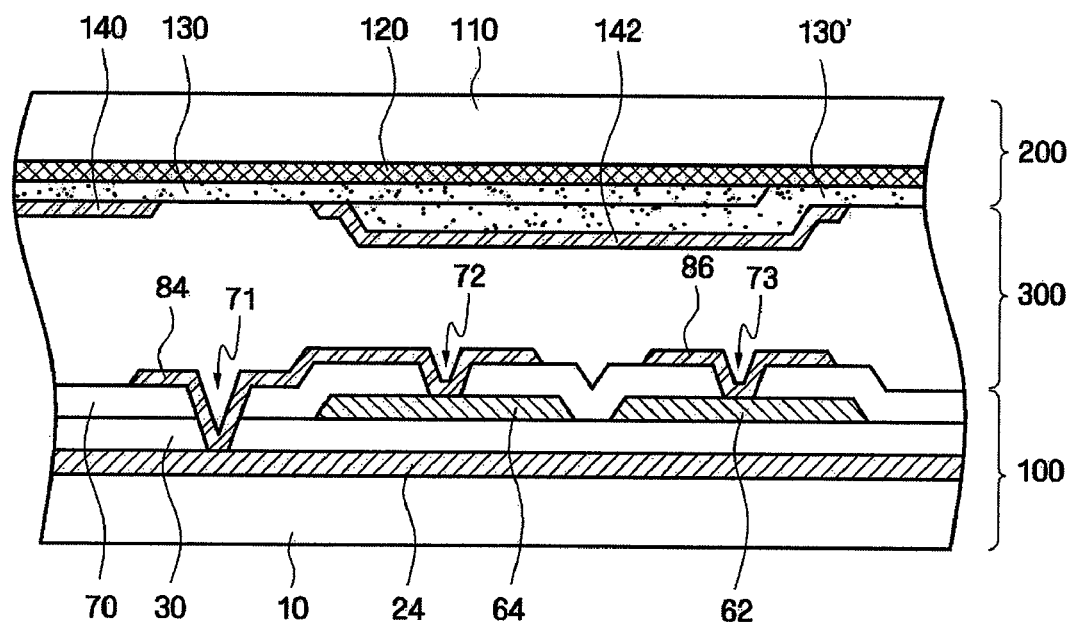
FIG. 3 is an exploded cross-sectional view of the touch screen display apparatus, taken along the line B-B' in FIG. 1.

FIG. 1 is a layout diagram of a touch screen display apparatus according to an embodiment of the present invention, FIG. 2 is an exploded cross-sectional view of the touch screen display apparatus, taken along the line A-A' in FIG. 1, and FIG. 3 is an exploded cross-sectional view of the touch screen display apparatus, taken along the line B-B' in FIG. 1.

The thin film transistor (TFT) will first be described. A gate line 22 is formed on a transparent substrate 10 in a transverse direction, and a gate electrode 26 is connected to gate line 22. Gate line 22 and gate electrode 26 constitute a gate conductor.

A storage conductor 28, which is separated from gate line 22, is disposed on transparent substrate 10 in the transverse direction. Storage conductor 28 is formed to overlap pixel electrode 82 within a pixel area. While the current embodiment illustrated in FIG. 1 shows the storage conductor 28 disposed at the center of the pixel area, the invention is not limited thereto. Rather, the shape and arrangement of storage conductor 28 may vary as long as it is possible to satisfy the condition in which a predetermined storage capacitance can be established with respect to pixel electrode 82.

Sensor conductor 24, which is separated from gate line 22, is disposed on transparent substrate 10 in the transverse direction. Sensor conductor 24 is responsible for transmission of a sensor voltage for driving a touch screen sensor. When pressure is applied, sensor conductor 24 and a data line 62 are electrically connected to each other by means of a sensor electrode 142 and the sensor voltage is transmitted through data line 62. In this way, the sensor voltage transmitted through data line 62 is sensed and position information about the position at which the pressure is applied is detected. The touch screen sensor comprises sensor conductor 24 providing a sensor voltage, data line 62 transmitting the sensor voltage, a first electrode pad 84, a second electrode pad 86 and sensor electrode 142 electrically connecting sensor conductor 24 with data line 62.

Gate conductor 22, 26, storage conductor 28, and sensor conductor 24 are preferably made of an Al containing metal such as Al and Al alloy, an Ag containing metal such as Ag and Ag alloy, a Cu containing metal such as Cu and Cu alloy, a Mo containing metal such as Mo and Mo alloy, Cr, Ti or Ta. In addition, gate conductor 22, 26, storage conductor 28, and sensor conductor 24 may have a multi-layered structure including two conductive films (not shown) having different physical characteristics. One of the two films is preferably made of a low resistivity metal including an Al containing metal, an Ag containing metal, and a Cu containing metal for reducing signal delay or voltage drop in gate conductor 22, 26. The other film is preferably made of material such as a Mo containing metal, Cr, Ta or Ti, which have good physical, chemical, and electrical contact characteristics with other materials such as indium tin oxide (ITO) or indium zinc oxide (IZO). Examples of combinations of the two films are a lower Cr film and an upper Al (Al alloy) film and a lower Al (Al alloy) film and an upper Mo (Mo alloy) film. However, gate conductor 22, 26, storage conductor 28, and sensor conductor 24 may be made of various metals or conductors.

A gate insulating layer 30 made of silicon nitride (SiNx) is formed on gate conductor 22, 26, storage conductor 28, and sensor conductor 24.

A semiconductor layer 40 made of hydrogenated amorphous silicon or polycrystalline silicon is formed on gate insulating layer 30. Semiconductor layer 40 may be formed in various shapes such as an island shape or a stripe shape, and, for example, may be formed in an island shape extending over gate electrode 26 under data line 62 like in the current embodiment of the present invention. When semiconductor layer 40 is formed in a stripe shape, it may be patterned in the same manner as data line 62.

Ohmic contact layers 55 and 56, which are made of silicide or n+ amorphous silicon hydride in which an n-type impurity is highly doped, are formed on semiconductor layer 40. Ohmic contact layers 55 and 56 may have a variety of shapes, including an island shape, a stripe shape, and so on. For example, when ohmic contact layers 55 and 56 are formed in an island shape, they are positioned below a source electrode 65 and a drain electrode 66. When the ohmic contact layers 55 and 56 are formed in a stripe shape, they may extend below data line 62.

Data line 62 and drain electrode 66 are formed on ohmic contact layers 55 and 56 and gate insulating layer 30. Data line 62 extends lengthwise and intersects gate line 22. A source electrode 65 protrudes from data line 22 in the form of a branch and extends over semiconductor layer 40. Drain electrode 66 is separated from source electrode 65 and is positioned on semiconductor layer 40 to be opposite to source electrode 65 in view of gate electrode 26. A thin film transistor is a three-terminal device consisting of gate electrode 26, source electrode 65 and drain electrode 66, and may be used as a switching element which allows current to flow between source electrode 65 and drain electrode 66 when a voltage is applied to gate electrode 26. Data line 62, source electrode 65, and drain electrode 66 constitute a data conductor 62, 65, 66.

Data line 62 intersects sensor conductor 24, and data line 62 and sensor conductor 24 are electrically connected with each other in the vicinity of an area where external pressure is applied to the substrate so that the sensor voltage supplied from sensor conductor 24 is transmitted through data line 62. The transmitted sensor voltage is sensed by an integrated data driver, which will later be described, and information about the position at which the external pressure is applied is detected. The driving mechanism of the touch screen sensor for sensing the position information based on the external pressure will later be described in detail.

A planarization pattern 64 is formed on sensor conductor 24 in the vicinity of the intersection area of data line 62 and sensor conductor 24. The planarization pattern 64 flattens the surface of the first electrode pad 84 formed on sensor conductor 24 and the surface of the second electrode pad 86 formed on data line 62.

Data conductor 62, 65, 66, and the planarization pattern 64 are preferably formed of chromium (Cr), a molybdenum (Mo) containing metal, a refractory metal such as tantalum (Ta) or titanium (Ti). That is, data conductor 62, 65, 66 and the planarization pattern 64 may be formed as a single layer or a multiple layer including a lower film (not shown) made of a refractory metal film and a low-resistivity upper film (not shown). Examples of the multiple layers include a double-layered structure having a lower Cr film and an upper Al (Al alloy) film, a double-layered structure having a lower Mo (Mo alloy) film and an upper Al (Al alloy) film, and a triple-layered structure having a lower Mo film, an intermediate Al film, and an upper Mo film.

At least a portion of source electrode 65 overlaps semiconductor layer 40, and at least a portion of drain electrode 66 facing source electrode 65 overlaps semiconductor layer 40. Ohmic contact layers 55 and 56 are interposed between the underlying semiconductor layer 40 and each of the overlying source electrode 55 and drain electrode 66 to reduce contact resistance between them.

A passivation layer 70 made of an insulating layer is formed on the data conductor 62, 65, 66 and the planarization pattern 64. Passivation layer 70 is preferably made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). When passivation layer 70 is made of an organic material, it may have a double-layered structure having a lower inorganic layer made of silicon nitride (SiNx) or silicon oxide ($SiO_2$) and an upper organic layer in order to prevent the organic material of passivation layer 70 from contacting an exposed portion of semiconductor layer 40 between source electrode 65 and drain electrode 66. In the current embodiment, as shown in FIG. 3, the invention has been described with regard to passivation layer 70 made of an inorganic insulator by way of example. However, other materials may be used.

Contact holes 72, 73, and 76 are formed on passivation layer 70 to expose the planarization pattern 64, data line 62, and drain electrode 66, respectively, and a contact hole 71 exposing sensor conductor 24 is formed on passivation layer 70 and gate insulating layer 30.

Pixel electrode 82, which is electrically connected with drain electrode 66 through contact hole 76, is formed on passivation layer 70 according to the pixel shape. Pixel electrode 82, to which data voltages are applied, generates an electric field together with common electrode 140 of the second plate 200 to determine the alignment of the liquid crystal molecules 310 of the liquid crystal layer 300 between pixel electrode 82 and common electrode 140.

A first electrode pad 84, connecting sensor conductor 24 with the planarization pattern 64 through contact holes 71 and 72, and a second electrode pad 86 connected to data line 62 through contact hole 73, are formed on passivation layer 70. Pixel electrode 82, first electrode pad 84 and second electrode pad 86 are made of a transparent conductor such as ITO or IZO or a reflective conductor such as Al.

The current embodiment has been described as forming the planarization pattern 64 below first electrode pad 84 to flatten the surfaces of first electrode pad 84 and second electrode pad 86. In detail, the first electrode pad 84 is connected to sensor conductor 24 and the planarization pattern 64 through contact holes 71 and 72, respectively. However, the surfaces of first electrode pad 84 and second electrode pad 86 can be flattened by disposing the first electrode pad 84 above the planarization pattern 64, rather than by connecting the first electrode pad 84 with the planarization pattern 64 through contact hole 72.

An alignment film (not shown) for alignment of the liquid crystal molecules 310 may be applied on pixel electrode 82, the first electrode pad 84, the second electrode pad 86 and passivation layer 70.

The foregoing has described the first plate 100 including a thin film transistor. Hereinafter, a second plate 200 including a color filter in a touch screen display apparatus according to an embodiment of the present invention will be described.

A black matrix 120 for preventing light leakage made of a transparent insulating material such as glass, and red, green, and blue color filters 130 are sequentially arranged to form a unit pixel. The black matrix 120 may be made of a metal (metal oxide), such as chromium or chromium oxide, or an organic black resist material.

A common electrode 140, which is made of a transparent conductive material such as ITO or IZO and has a domain divider 152, is formed on black matrix 120 and color filters 130. In addition, as shown in FIGS. 1 and 3, sensor electrode 142, which is electrically insulated from common electrode 140, is formed on color filters 130 to overlap first electrode pad 84 and second electrode pad 86. Sensor electrode 142 may be made of the same material as common electrode 140, that is, a transparent conductive material such as ITO or IZO. When external pressure is applied, sensor electrode 142 comes into contact with first electrode pad 84 and second electrode pad 86 so that sensor conductor 24 and data line 62 are electrically connected together at the point where the pressure is applied. An integrated data driver connected to data line 62 senses the sensor voltage transmitted through data line 62 and recognizes position information about the external pressure applied in a longitudinal direction.

When pressure is applied common electrode 140 is prevented from contacting pixel electrode 82 (as sensor electrode 142 contacts first electrode pad 84 and second electrode pad 86), sensor conductor 24 is preferably positioned closer to the first plate 100 than to common electrode 140. To this end, at least two color filters 130 and 130' of the red, green, and blue color filters are preferably formed below sensor electrode 142 to overlap each other. In the embodiment shown in FIG. 3, the invention is explained with regard to two color filters 130 and 130' overlapping each other by way of example. However, the invention is not limited to the illustrated example, and all of the red, green, and blue color filters may overlap with one another to then form sensor electrode 142 on the overlapping areas of the filters.

Figure 4:
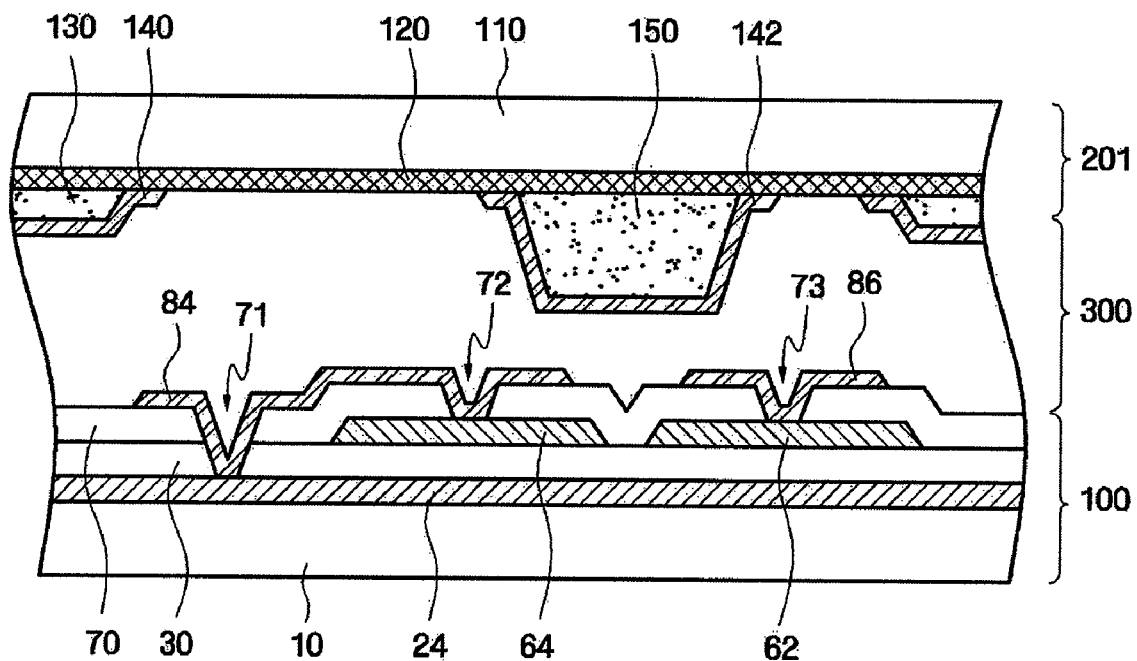
FIG. 4 is a modified example of a second plate shown in FIG. 3.

FIG. 4 is a modified example of a second plate shown in FIG. 3. As shown in FIG. 4, in order to locate sensor electrode 142 closer to the first plate 100 than to common electrode 140, a sensor spacer 150 may be formed under sensor electrode 142. Since sensor electrode 142 should be isolated from first electrode pad 84 and second electrode pad 86 in the absence of an applied external pressure, the height of sensor spacer 150 is preferably smaller than that of a cell gap between the first plate 100 and the second plate 200.

In the presence of applied external pressure, sensor electrode 142 on sensor spacer 150 comes into contact with first electrode pad 84 and second electrode pad 86 so that sensor conductor 24 and data line 62 are electrically connected with each other. To maintain a cell gap, sensor spacer 150 is interposed between the first and second plates 100 and 200 and generally made of the same material with support spacers (not shown) for supporting the first and second plates 100 and 200. The height of sensor spacer 150 is preferably less than that of each of the support spacers. In the following description, for brevity, preferred embodiments of the present invention will be explained with regard to the second plate 200 shown in FIG. 3.

Referring back to FIGS. 1 through 3, an alignment film (not shown) for alignment of liquid crystal molecules may be coated on common electrode 140.

The first plate 100 and the second plate 200 are aligned and then combined with each other and liquid crystal layer 300 is formed therebetween, thereby forming the basic structure of the touch screen display apparatus. The first plate 100 and the second plate 200 are aligned such that pixel electrode 82 exactly corresponds to and overlaps color filters 130. The illustrated touch screen display apparatus further comprises a polarizing plate, a backlight, and so on.

Figure 5:
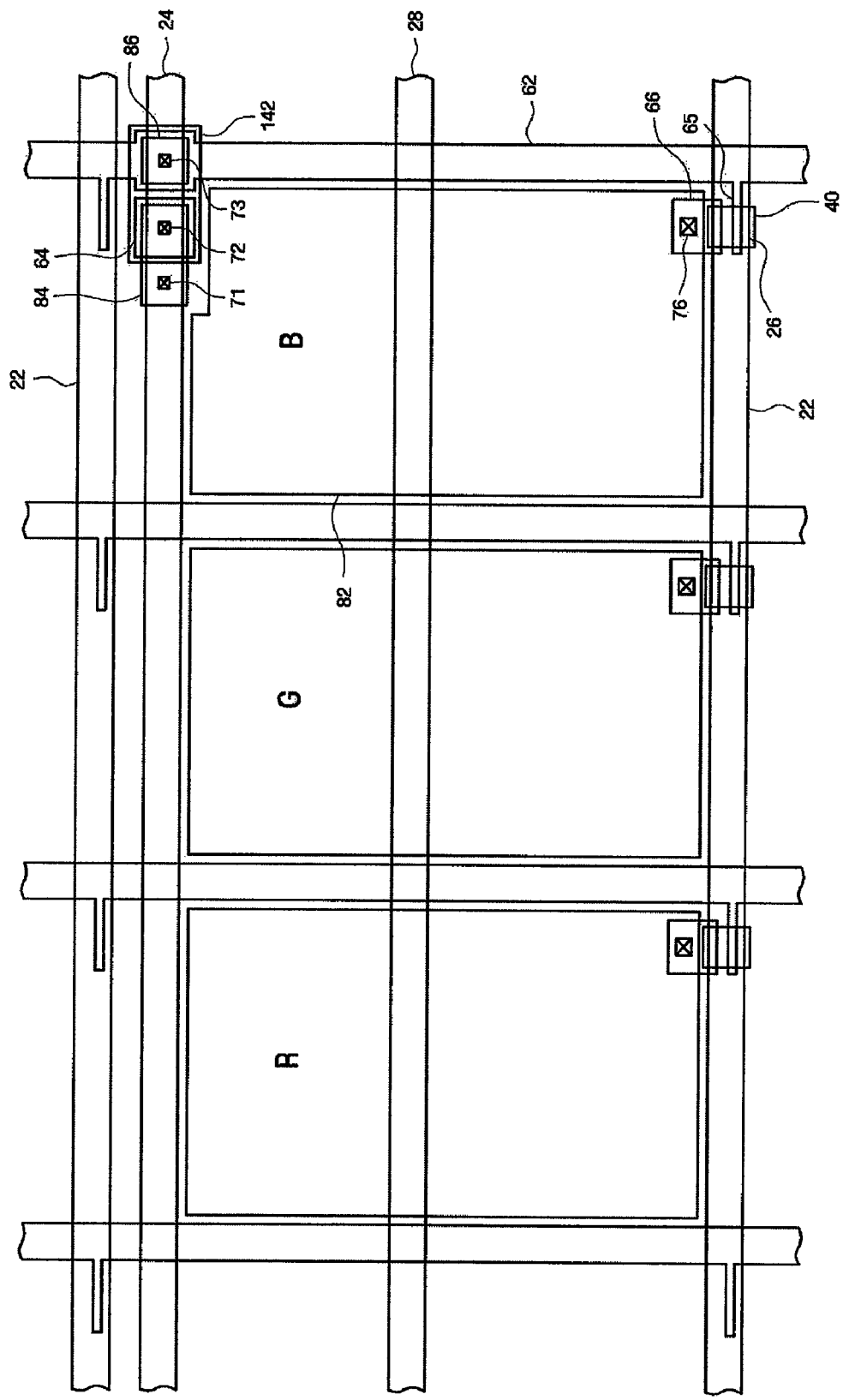
FIG. 5 is a layout diagram of a touch screen display apparatus including a plurality of pixels according to an embodiment of the present invention.

FIG. 5 is a layout diagram of a touch screen display apparatus including a plurality of pixels according to an embodiment of the present invention. As shown in FIG. 5, a dot consists of red (R), green (G), and blue (B) pixels. The data line constituting a touch screen sensor may be implemented as a data line 62 of the blue (B) pixel because, in general, the blue (B) pixel has the smallest influence on the overall luminance. Overall luminance is the sum of the luminances of the respective red (R), green (G), and blue (B) pixels.

For example, the luminance ratio of the red (R), green (G), and blue (B) pixels by which the overall luminance is affected is approximately 2:5:0.5. In a pixel with a touch screen sensor, a pixel electrode 82 has a relatively small area, compared to a pixel without a touch screen sensor. Thus, the reduction in overall luminance due to the presence of the touch screen sensor can be prevented by forming the touch screen sensor at the blue (B) pixel that has the smallest influence on the overall luminance. However, the present invention is not limited to the illustration and the touch screen sensor can be formed at any pixel other than the blue (B) pixel.

Figure 6:
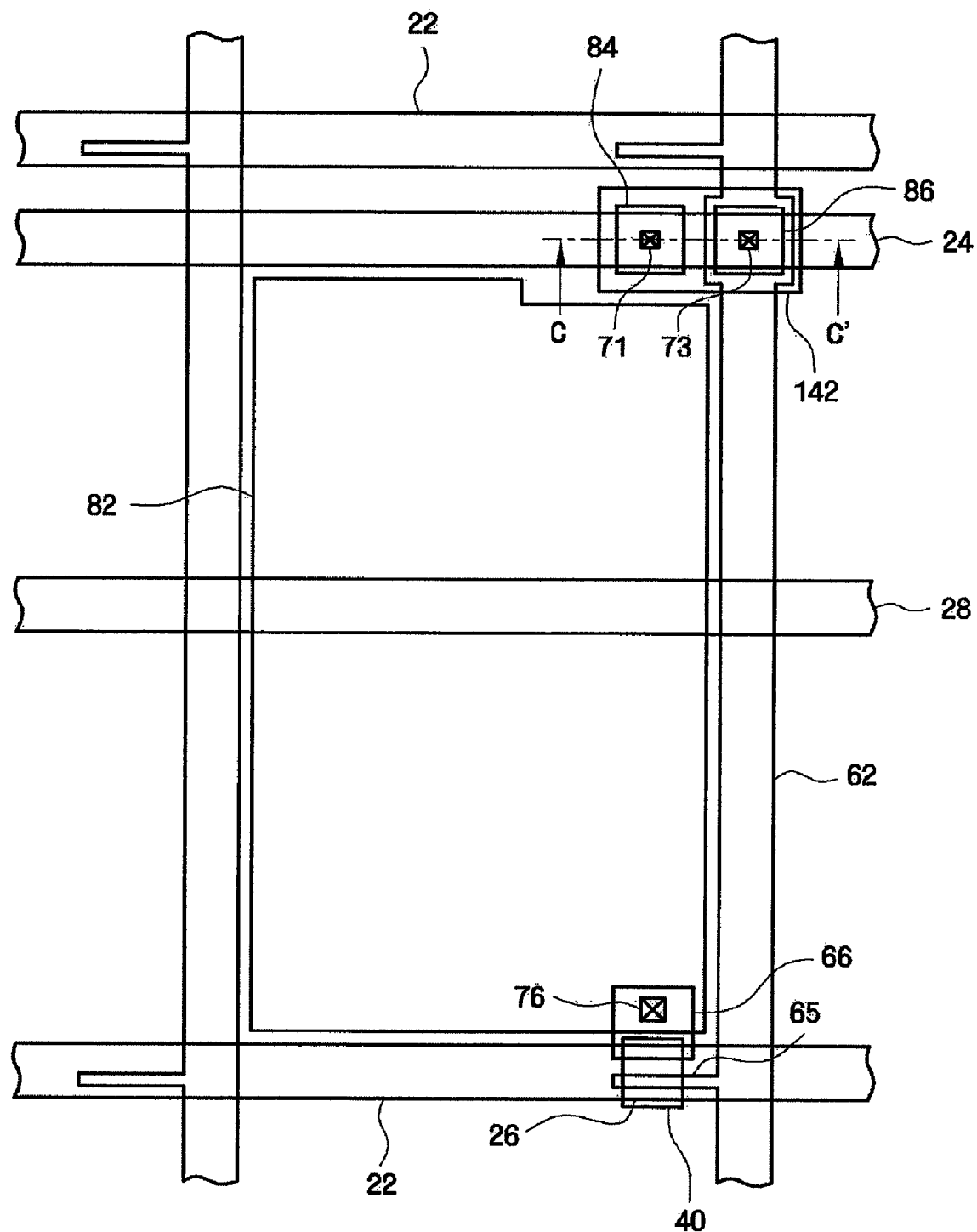
FIG. 6 is a layout diagram of a touch screen display apparatus according to another embodiment of the present invention.
Figure 7:
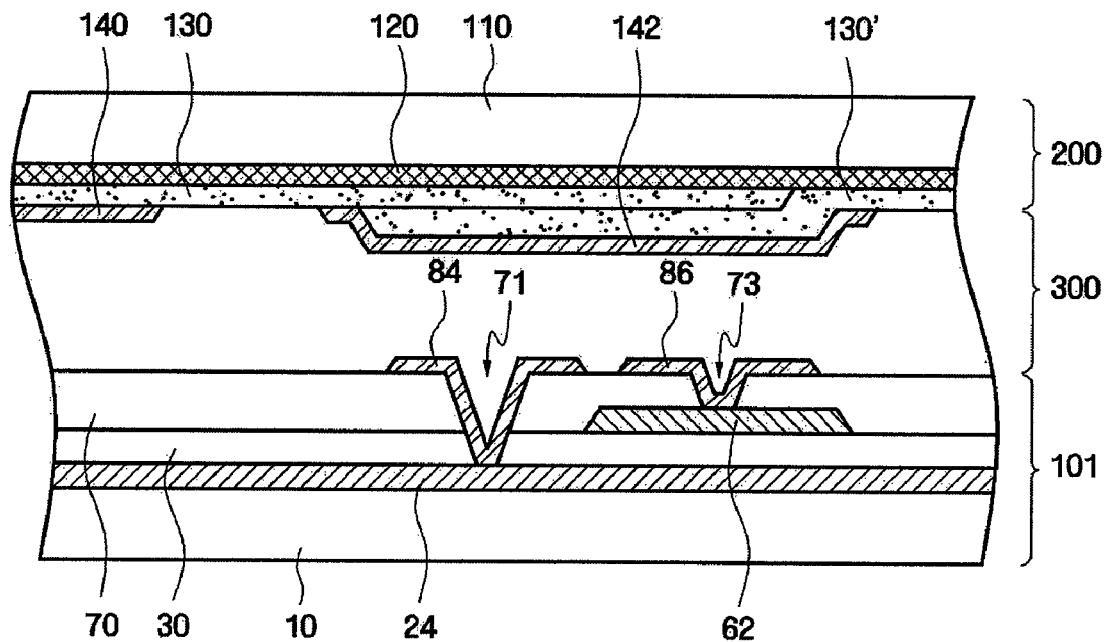
FIG. 7 is an exploded cross-sectional view of the touch screen display apparatus, taken along the line C-C' in FIG. 6.

A touch screen display apparatus according to another embodiment of the present invention will now be described with reference to FIGS. 6 and 7. FIG. 6 is a layout diagram of a touch screen display apparatus and FIG. 7 is an exploded cross-sectional view of the touch screen display apparatus, taken along the line C-C' in FIG. 6. For convenience of explanation, components having the same function as previously described are respectively identified by the same reference numerals, and the description thereof will not be repeated. As shown in FIGS. 6 and 7, the touch screen display apparatus according to the current embodiment has substantially the same structure as the touch screen display apparatus according to the previous embodiment except for the followings.

When passivation layer 70 formed on first substrate 101 is made of a photosensitive organic material having a good flatness characteristic, the surface of first electrode pad 84 formed on a sensor conductor 24 and the surface of second electrode pad 86 formed on data line 62 will be sufficiently flat. Accordingly, formation of a planarization pattern may be omitted.

Figure 8:
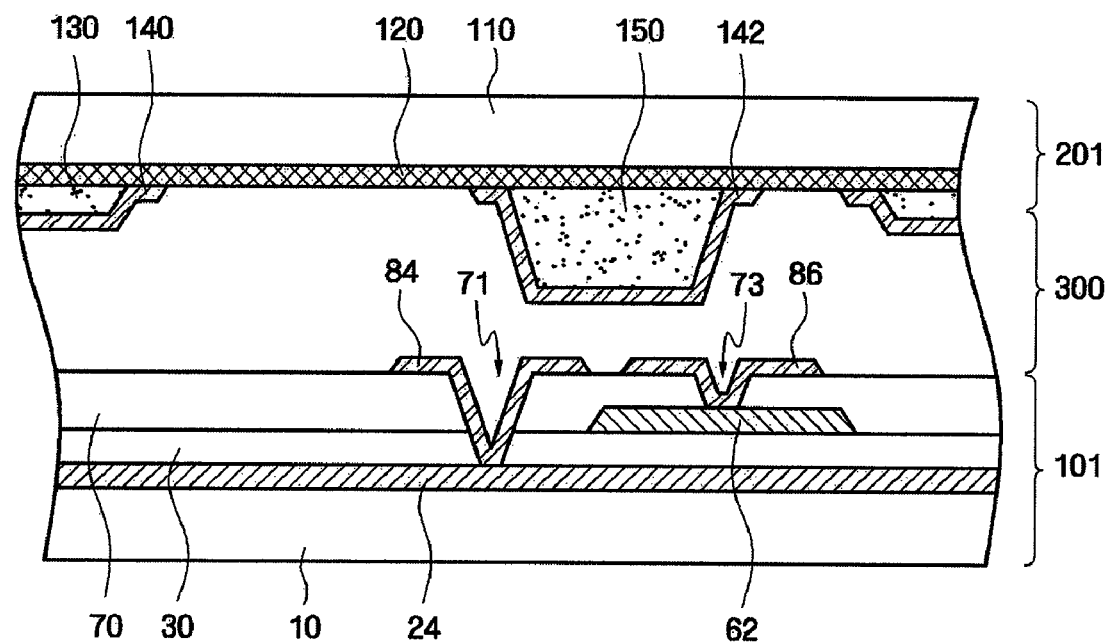
FIG. 8 is a modified example of a second plate shown in FIG. 7.

FIG. 8 is a modified example of a second plate shown in FIG. 7. As shown in FIG. 8, to make a sensor electrode 142 closer to the first plate 101 than to a common electrode 140, a sensor spacer 150 may be formed below sensor electrode 142. Sensor spacer 150 is substantially the same as the sensor spacer shown in FIG. 4 in operation and functional effect.

Figure 9:
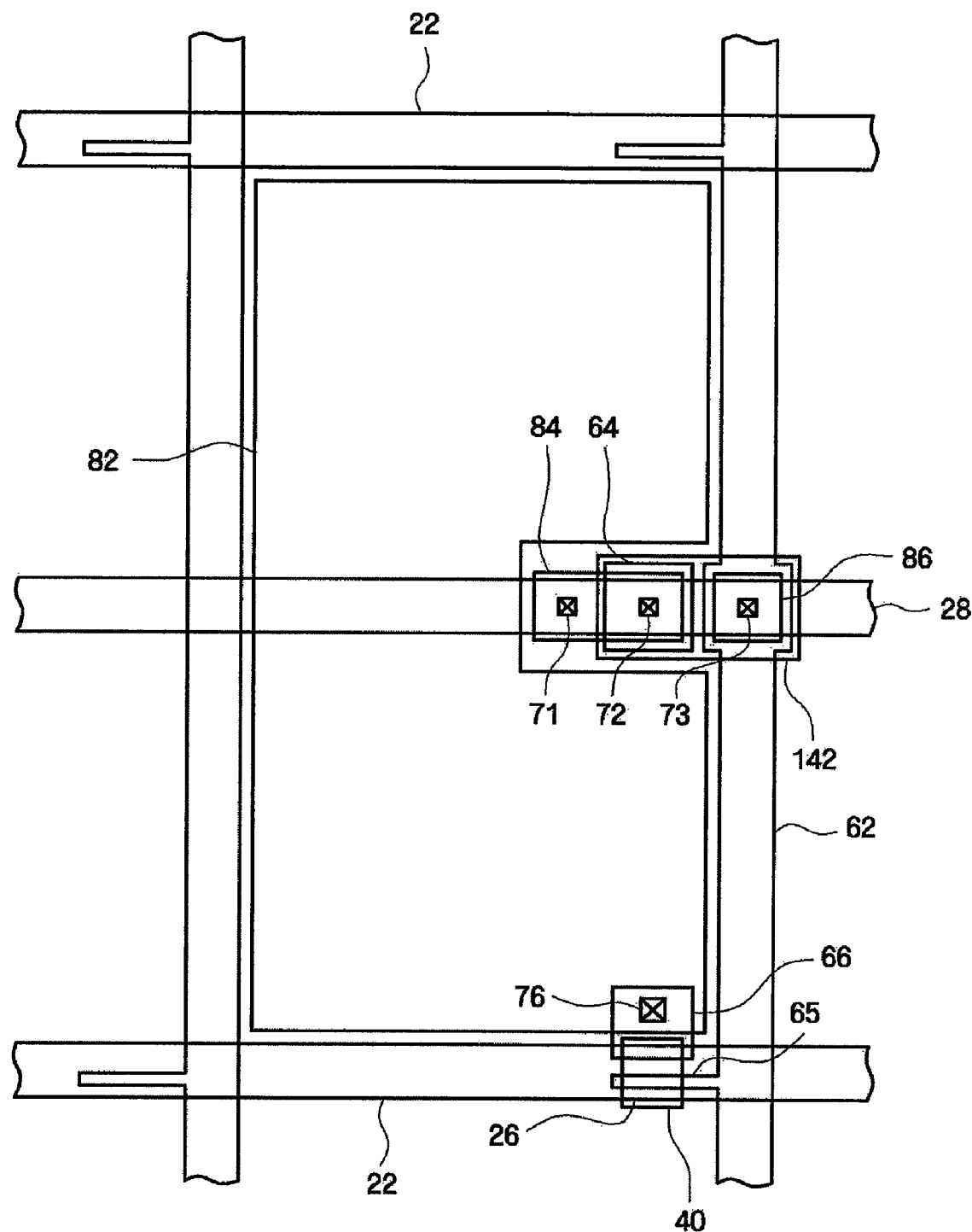
FIG. 9 is a layout diagram of a touch screen display apparatus according to still another embodiment of the present invention.

Next, a touch screen display apparatus according to still another embodiment of the present invention will be described with reference to FIG. 9. FIG. 9 is a layout diagram of a touch screen display apparatus according to still another embodiment of the present invention. For convenience of explanation, components having the same function as described in the previous embodiment shown in FIGS. 1 through 5 are respectively identified by the same reference numerals, and a detailed description thereof will not be repeated. As shown in FIG. 9, the touch screen display apparatus according to the current embodiment has substantially the same structure as the touch screen display apparatus according to the previous embodiment except for the followings.

A sensor conductor constituting a touch screen sensor may be implemented as a storage conductor 28. A common voltage and a sensor voltage for driving a touch screen are alternately applied across storage conductor 28. That is to say, the common voltage is basically applied across storage conductor 28 and the sensor voltage is applied only at a predetermined time to detect position information about a position at which the external pressure is applied. Here, the sensor voltage may be greater than or smaller than the common voltage.

Like the touch screen display apparatus shown in FIGS. 6 and 7, the touch screen display apparatus according to the current embodiment may also omit the formation of a planarization pattern.

Figure 10:
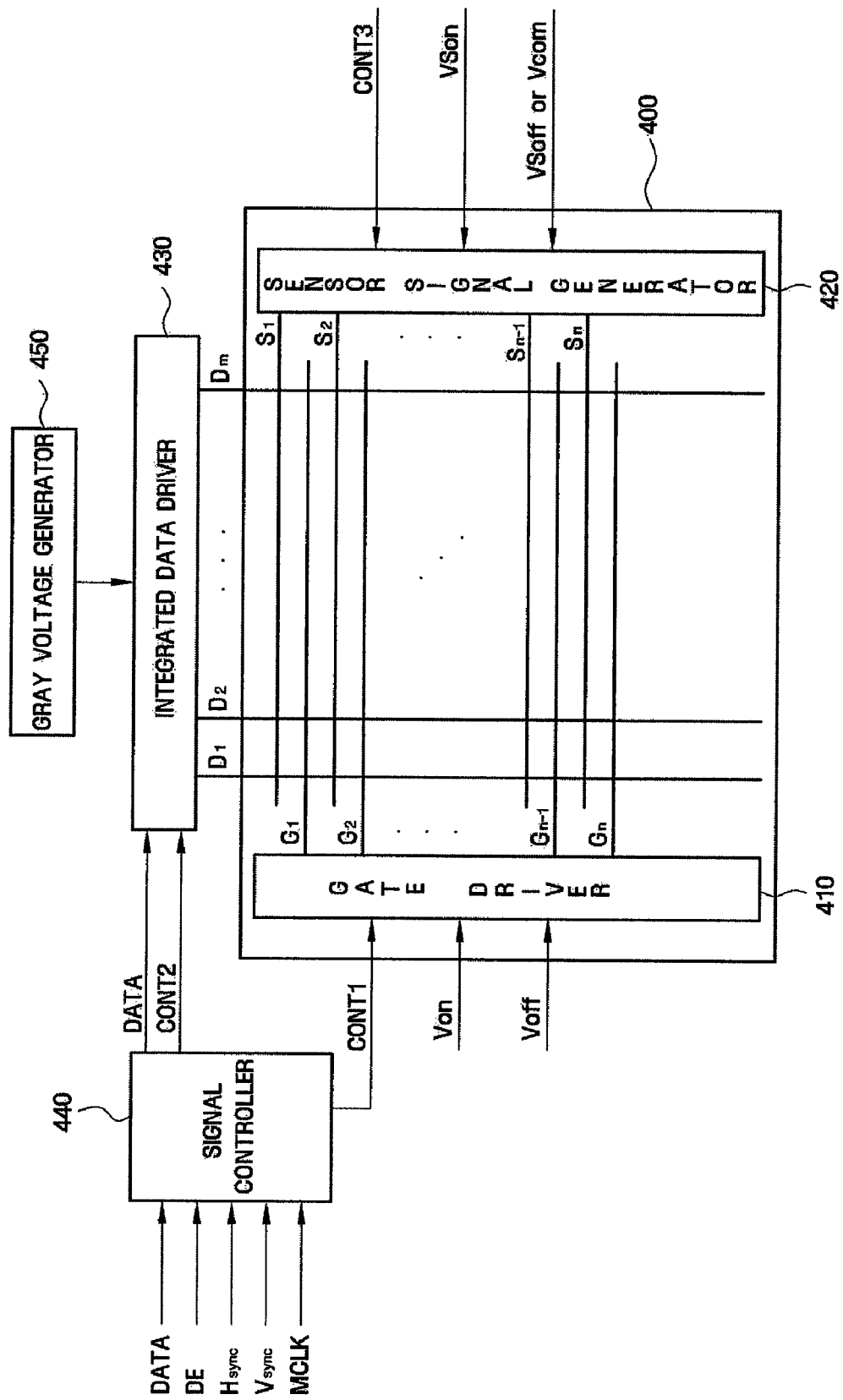
FIG. 10 is a block diagram of a touch screen display apparatus according to an embodiment of the present invention.

Hereinafter, a method of driving a touch screen display apparatus according to an embodiment of the present invention will be described with reference to FIGS. 10 through 14. FIG. 10 is a block diagram of a touch screen display apparatus according to an embodiment of the present invention.

Referring to FIG. 10, the touch screen display apparatus according to an embodiment of the present invention comprises a liquid crystal panel 400 including a pair of plates defined by a plurality of display regions, a gate driver 410 and an integrated data driver 430 coupled to the liquid crystal panel 400, a gray voltage generator 450 coupled to the integrated data driver 430, a sensor signal generator 420 providing a sensor voltage to the liquid crystal panel 400, and a signal controller 440 controlling these functional components. The gate driver 410 and the sensor signal generator 420 may be integrated on the liquid crystal panel 400.

In an equivalent circuit of the liquid crystal panel 400, the liquid crystal panel 400 includes a plurality of display signal lines and a plurality of pixels connected to the display signal lines and arranged substantially in a matrix, the liquid crystal panel 400 comprised of first and second plates facing each other, and a liquid crystal layer interposed between the first plate and the second plate.

The display signal lines are provided in the first plate, comprising a plurality of gate lines $G_1$-$G_n$ for transmission of gate signals and a plurality of data lines $D_1$-$D_m$ for transmission of data signals. The gate lines $G_1$-$G_n$ extend substantially in a row direction and are substantially parallel to one another. The data lines $D_1$-$D_m$ extend substantially in a column direction and are substantially parallel to one another.

A plurality of sensor conductors $S_1$-$S_n$ for transmission of sensor voltages are also provided in the first plate and are arranged substantially parallel to the gate lines $G_1$-$G_n$. The sensor conductors $S_1$-$S_n$ and the gate lines $G_1$-$G_n$ alternate with each other.

Signal controller 440 generates various timing signals and controls gate driver 410, integrated data driver 430, and sensor signal generator 420. That is to say, signal controller 440 is supplied with input image signals DATA and input control signals for controlling the display thereof from an external device, e.g., a vertical synchronization signal Vsync, a horizontal synchronization signal Hsync, a main clock MCLK, and a data enable signal DE. On the basis of the input control signals and the input image signals DATA, signal controller 440 appropriately processes the image signals DATA in a suitable manner for the operation of the liquid crystal panel 400 to output its processed image signals DATA' Controller 440 generates gate control signals CONT1, data control signals CONT2, and sensor control signals CONT3. Controller 440 transmits gate control signals CONT1 to gate driver 410, transmits data control signals CONT2 and the processed image signals DATA' to integrated data driver 430, and transmits sensor control signals CONT3 to sensor signal generator 420, respectively.

The gate control signals CONT1 include a vertical scanning start signal STV for instructing the start of image scanning, a gate clock signal CPV for determining the duration of the gate-on voltage Von, a gate-on enable signal OE for enabling gate driving signals, a first clock signal CKV1 and a first clock inversion signal CKBV1 for controlling the output time of the gate-on voltage Von, the first clock signal CKV1 and the first clock inversion signal CKBV1 having phases opposite to each other.

The data control signals CONT2 include a horizontal scanning start signal STH for indicating the start of data transmission for a group of pixels, a load signal LOAD for instructing to apply corresponding data voltages to the data lines $D_1$-$D_m$, and a data clock signal HCLK. The data control signals CONT2 may further include an inversion signal RVS for reversing the polarity of the data signals with respect to a common voltage Vcom.

The sensor control signals CONT3 include a vertical scanning start signal STV' for instructing to start image scanning for the sensor conductors $S_1$-$S_n$, a second clock signal CKV2 and a second clock inversion signal CKBV2 for controlling the output time of a sensor-on voltage VSon, the second clock signal CKV2 and the second clock inversion signal CKBV2 having phases opposite to each other.

Responsive to the gate control signals CONT2 from signal controller 440, integrated data driver 430 receives the image signals DATA' for the group of pixels from signal controller 440, converts the image signals DATA' into data charge signals (or data voltages) selected from the gray voltages supplied from the gray voltage generator 450, and applies the data charge signals to the data lines $D_1$-$D_m$. In addition, the integrated data driver 430 detects a position where an external pressure is applied to liquid crystal panel 400 when sensor driving signals generated from sensor signal generator 420 are transmitted to data lines $D_1$-$D_m$.

Gate driver 410 applies a gate-on voltage Von to gate lines $G_1$-$G_n$ according to the gate control signals CONT1 supplied from signal controller 440 to turn on thin film transistors connected to the gate lines $G_1$-$G_n$. Accordingly, the data voltage applied to data lines $D_1$-$D_m$ are applied to the corresponding pixels through the turned on thin film transistors. Then, gate driver 410 applies a gate-off voltage Voff to the gate lines $G_1$-$G_n$ according to the gate control signals CONT1 to turn off thin film transistors connected to gate lines $G_1$-$G_n$ (Hereinafter, the gate-on voltage Von is referred to as a gate driving signal.)

Gate driver 410 includes a shift register having a plurality of cascade-connected stages, each of which the output terminal is connected to each gate line $G_i$. Accordingly, the stages are sequentially driven and then sequentially output the gate driving signal to the respective gate lines $G_1$-$G_n$. That is to say, gate driver 410 sequentially applies the gate driving signal having a high voltage level to gate lines $G_1$-$G_n$ in response to the vertical scanning start signal STV to control the data charge signals to be applied to the respective pixels. Here, the gate driving signal has a voltage level high enough to drive (turn on) a thin film transistor connected to each of the gate lines $G_1$-$G_n$. When the thin film transistor is driven by the gate driving signal, the data charge signals are applied to pixel electrodes through the corresponding pixels to then charge the liquid crystal layer.

The difference between the data voltage applied to a pixel and the common voltage Vcom is represented as a charge voltage across a liquid crystal capacitor, that is, a pixel voltage. Liquid crystal molecules in the liquid crystal capacitor have different orientations depending on the magnitude of the pixel voltage, and the orientations determine the polarization of light passing through the liquid crystal layer, which is converted into the light transmittance.

Sensor signal generator 420 sequentially applies the sensor-on voltage VSon to the sensor conductors $S_1$-$S_n$ responsive to the corresponding sensor control signal CONT3 supplied from the signal controller 440. Next, sensor signal generator 420 applies the sensor-off voltage VSoff to the sensor conductors $S_1$-$S_n$ responsive to the corresponding sensor control signal CONT3 (Hereinafter, the sensor-on voltage VSon is referred to as a sensor driving signal.). In a case where storage conductors are used as the sensor conductors $S_1$-$S_n$, the sensor-off voltage VSoff may be the common voltage Vcom.

Sensor signal generator 420 includes a shift register having a plurality of cascade-connected stages, each having an output terminal connected to a respective sensor conductor $S_i$. Accordingly, the stages are sequentially driven and then sequentially output the sensor driving signal to the respective sensor conductors $S_1$-$S_n$. That is to say, sensor signal generator 420 sequentially applies the sensor driving signal having a high voltage level to the sensor conductors $S_1$-$S_n$ in response to the vertical scanning start signal STV'.

Integrated data driver 430 electrically connects sensor conductors $S_1$-$S_n$ with the data lines $D_1$-$D_m$ at the position where external pressure is applied to the liquid crystal panel 400 so that it can detects the position by sensing the sensor driving signal transmitted through the data lines $D_1$-$D_m$.

Figure 11:
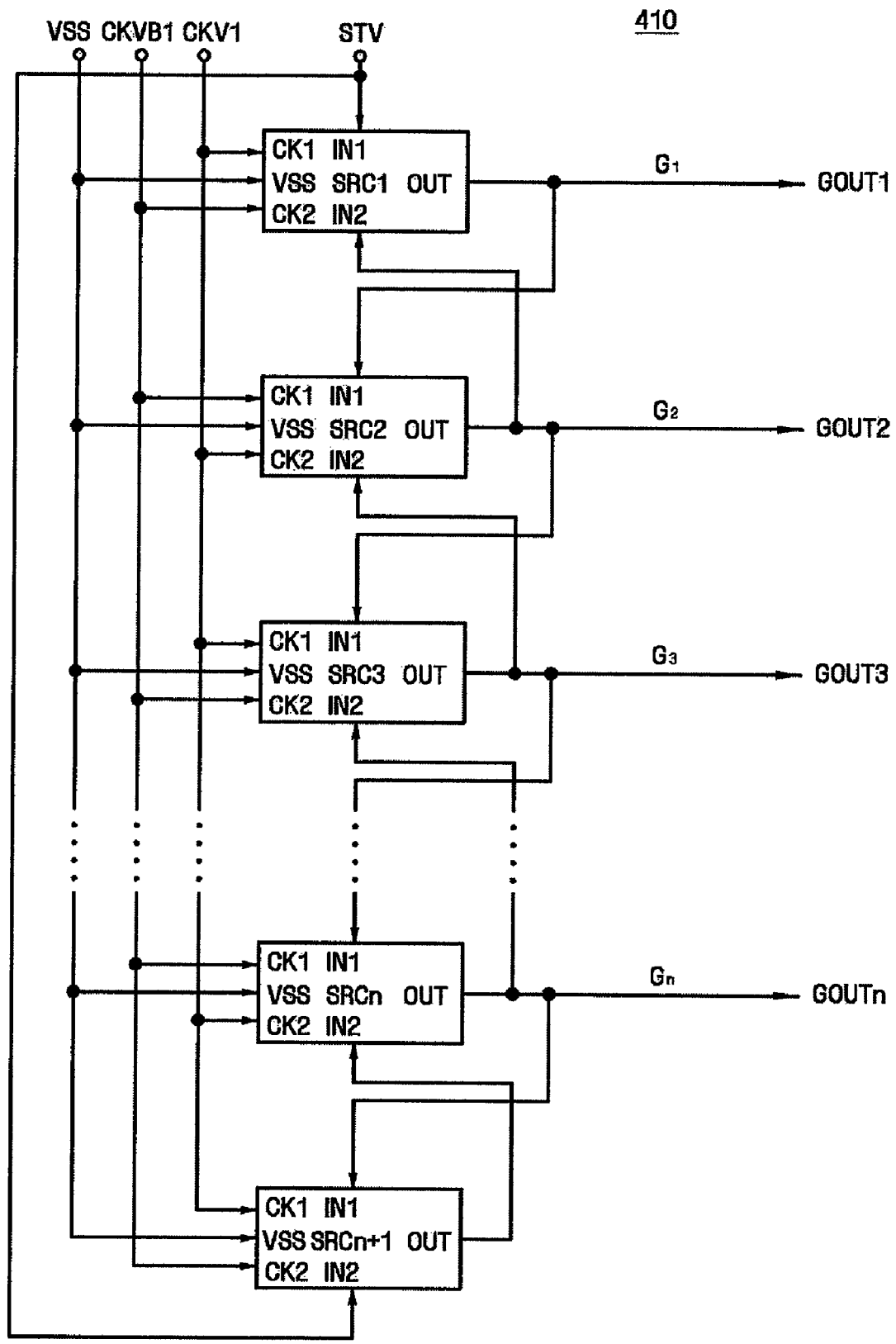
FIG. 11 is a block diagram of a gate driver shown in FIG. 10.

Gate driver 410 includes a shift register having a plurality of stages SRC1, . . . , SRCn+1 that are cascade-connected each other. In detail, the shift register includes first through nth stages SRC1, . . . , SRCn that output gate driving signals (or scanning signals) to the n gate lines $G_1$-$G_n$, and a dummy stage SRCn+1 providing a control signal to the previous stage. Hereinafter, gate driver 410 will be described in greater detail with reference to FIGS. 10 and 11. FIG. 11 is a block diagram of a gate driver shown in FIG. 10.

Each of the stages SRC1, . . . , SRCn includes a first clock terminal CK1, a second clock terminal CK2, a first input terminal IN1, a second input terminal IN2, an output terminal OUT, and a ground voltage terminal VSS.

In each of odd numbered stages SRC1, SRC3, . . . , SRCn+1, a first clock signal CKV1 is applied to the first clock terminal CK1 and a first clock inversion signal CKVB1 having a phase opposite to that of the first clock signal CKV1 is applied to the second clock terminal CK2. In each of even numbered stages SRC2, SRC4, . . . , SRCn, the first clock inversion signal CKVB1 is applied to the first clock terminal CK1 and the first clock signal CKV1 is applied to the second clock terminal CK2.

The output terminals OUT of the odd numbered stages SRC1, SRC3, . . . , SRCn+1 output the first clock signal CKV1, while the output terminals OUT of the even numbered stages SRC2, SRC4, . . . , SRCn output the first clock inversion signal CKVB1. The output terminals OUT of the n stages SRC1, SRC2, . . . , SRCn are electrically connected to corresponding gate lines among the n gate lines $G_1$-$G_n$ provided in display regions of a liquid crystal panel. Accordingly, the shift register sequentially drives the n gate lines $G_1$-$G_n$.

The signal output from the previous stage is input into the first input terminal IN1, and a signal outputted from the next stage is input into the second input terminal IN2.

The vertical scanning start signal STV, instead of the signal output from the previous stage, is provided to the first input terminal IN1 of the first stage SRC1. In addition, the vertical scanning start signal STV, instead of the signal output from the next stage, is provided to the second input terminal IN2 of the (n+1)th stage SRCn+1. The second input terminal IN2 of the nth stage SRCn is provided with the output signal from the output terminal OUT of the (n+1)th stage SRCn+1.

Hereinafter, the structure and operation of each of the stages SRC1, SRC2, ..., SRCn will be described.

As described above, each of the stages SRC1, SRC2, ..., SRCn includes a first clock terminal CK1, a second clock terminal CK2, a first input terminal IN1, a second input terminal IN2, an output terminal OUT, and a ground voltage terminal VSS.

The first input terminal IN1 is connected to the output terminal OUT of the previous driving stage, the second input terminal IN2 is connected to the output terminal OUT of the next driving stage, the output terminal OUT is connected to each of the gate lines $G_1$-$G_n$ corresponding to the respective stages SRC1, SRC2, ..., SRCn, and a ground voltage is applied to the ground voltage terminal VSS.

In detail, the first stage SRC1 receives the first clock signal CKV1 and the first clock inversion signal CKVB1, which are supplied from an external circuit through the first clock terminal CK1 and the second clock terminal CK2, the vertical scanning start signal STV, which is supplied through the first input terminal IN1, and a second gate driving signal GOUT2, which is supplied from the second stage SRC2 through the second input terminal IN2, respectively, to then output a first gate driving signal GOUT1 for selecting the first gate line $G_1$ to the output terminal OUT. The first gate driving signal GOUT1 is also output to the first input terminal IN1 of the second stage SRC2.

The second stage SRC2 receives the first clock inversion signal CKVB1 and the first clock signal CKV1, which are supplied from an external circuit through the first clock terminal CK1 and the second clock terminal CK2, the first gate driving signal GOUT1, which is supplied from the first stage SRC1 through the first input terminal IN1, and a third gate driving signal GOUT3, which is supplied from the third stage SRC3 through the second input terminal IN2, respectively, to then output the second gate driving signal GOUT2 for selecting the second gate line $G_2$ to the output terminal OUT. The second gate driving signal GOUT2 is also output to the first input terminal IN1 of the third stage SRC3.

Likewise, the nth stage SRCn receives the first clock inversion signal CKVB1 and the first clock signal CKV1, which are supplied from an external circuit through the first clock terminal CK1 and the second clock terminal CK2, the (n−1)th gate driving signal GOUTn−1, which is supplied from the (n−1)th stage SRCn−1 through the first input terminal IN1, and a (n+1)th gate driving signal GOUTn+1, which is supplied from a dummy stage SRCn+1 through the second input terminal IN2, respectively, to then output the nth gate driving signal GOUTn for selecting the nth gate line $G_n$ to the output terminal OUT. The nth gate driving signal GOUTn is also output to the first input terminal IN1 of the dummy stage SRCn+1.

Hereinafter, sensor signal generator 420 will be described in greater detail with reference to FIGS. 10 and 12.

Sensor signal generator 420 includes a shift register having a plurality of stages SRC1', ..., SRCn+1' that are cascade-connected with each other. In detail, sensor signal generator 420 includes first through nth stages SRC1', ..., SRCn' that output sensor driving signals to the sensor conductors $S_1$-$S_n$, and a dummy stage SRCn+1' providing a control signal to the previous stage.

Each of the stages SRC1', ..., SRCn' includes a first clock terminal CK1, a second clock terminal CK2, a first input terminal IN1, a second input terminal IN2, an output terminal OUT, and a ground voltage terminal VSS.

In each of odd numbered stages SRC1', SRC3', ..., SRCn+1', a second clock signal CKV2 is applied to the first clock terminal CK1 and a second clock inversion signal CKVB2 having a phase opposite to that of the second clock signal CKV2 is applied to the second clock terminal CK2. In each of even numbered stages SRC2', SRC4', ..., SRCn', the second clock inversion signal CKVB2 is applied to the first clock terminal CK1 and the second clock signal CKV2 is applied to the second clock terminal CK2.

The output terminals OUT of the odd numbered stages SRC1', SRC3, ..., SRCn+1' output the second clock signal CKV2, while the output terminals OUT of the even numbered stages SRC2', SRC4', ..., SRCn' output the second clock inversion signal CKVB2. The output terminals OUT of the n stages SRC1', SRC2', ..., SRCn' are electrically connected to corresponding sensor conductors among the n sensor conductors $S_1$-$S_n$ provided in display regions of the liquid crystal panel 400. Accordingly, the shift register sequentially drives the n sensor conductors $S_1$-$S_n$.

The signal output from the previous stage is input into the first input terminal IN1, and a signal output from the next stage is input into the second input terminal IN2.

Figure 12:
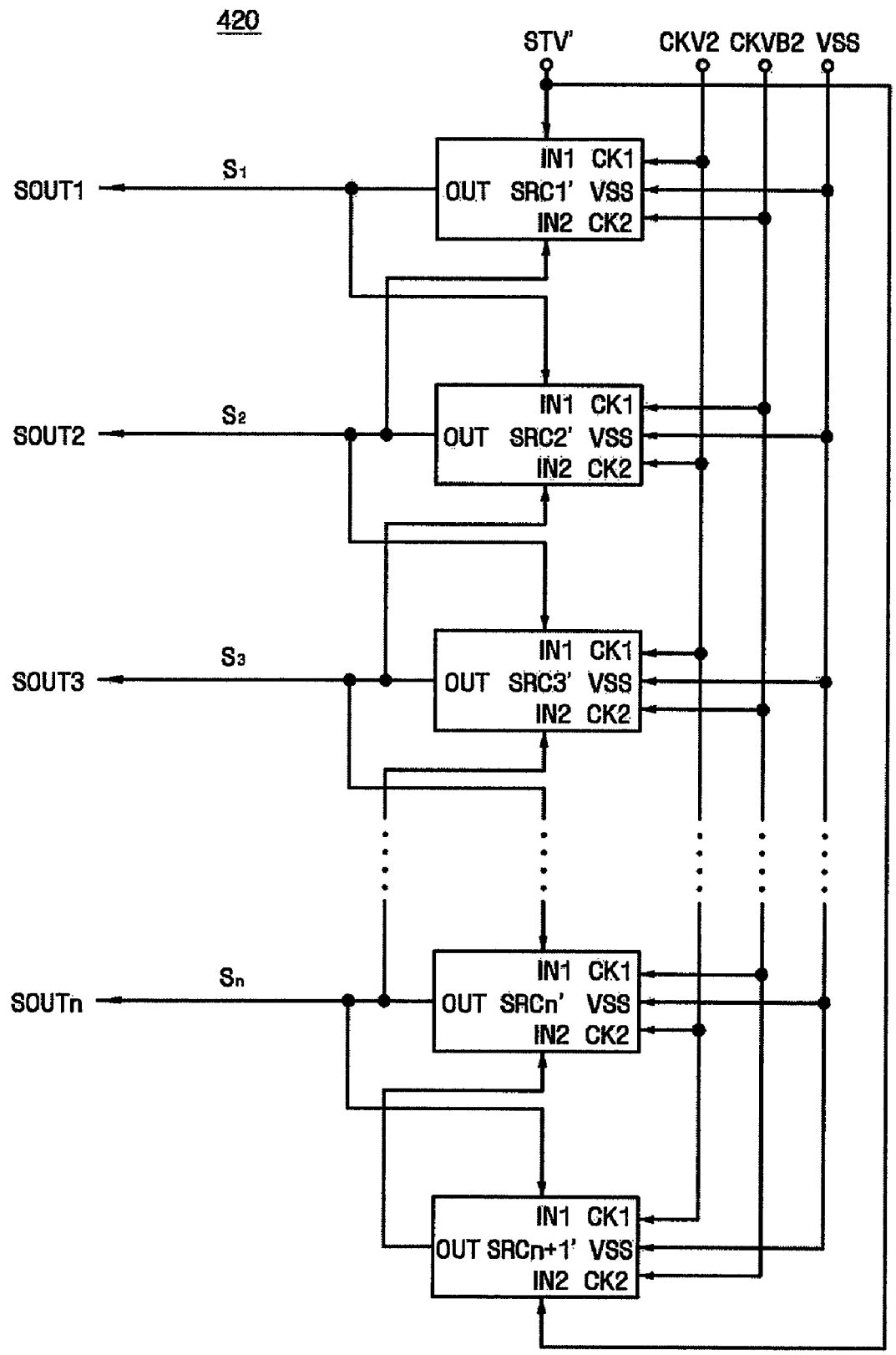
FIG. 12 is a block diagram of a sensor signal generator shown in FIG. 10.

In FIG. 12, the vertical scanning start signal STV', instead of the signal output from the previous stage, is provided to the first input terminal IN1 of the first stage SRC1'. In addition, the vertical scanning start signal STV', instead of the signal output from the next stage, is provided to the second input terminal IN2 of the (n+1)th stage SRCn+1'. The second input terminal IN2 of the nth stage SRCn' is provided with the output signal from terminal OUT of the (n+1)th stage SRCn+1'.

Hereinafter, the structure and operation of each of the stages SRC1', SRC2', ..., SRCn' will be described.

As described above, each of the stages SRC1', SRC2', ..., SRCn' includes a first clock terminal CK1, a second clock terminal CK2, a first input terminal IN1, a second input terminal IN2, an output terminal OUT, and a ground voltage terminal VSS.

The first input terminal IN1 is connected to the output terminal OUT of the previous driving stage, the second input terminal IN2 is connected to the output terminal OUT of the next driving stage, the output terminal OUT is connected to each of the sensor conductors $S_1$-$S_n$ corresponding to the respective stages SRC1', SRC2', ..., SRCn', and a ground voltage is applied to the ground voltage terminal VSS.

In detail, the first stage SRC1' receives the first clock signal CKV1 and the first clock inversion signal CKVB1 from an external circuit through the first clock terminal CK1 and the second clock terminal CK2. The vertical scanning start signal STV' is supplied through the first input terminal IN1. A second sensor driving signal SOUT2 is supplied from the second stage SRC2' through the second input terminal IN2. A first sensor driving signal SOUT1 for selecting the first sensor conductor $S_1$ is output at output terminal OUT. The first sensor driving signal SOUT1 is also output to the first input terminal IN1 of the second stage SRC2'.

The second stage SRC2' receives the second clock inversion signal CKVB2 and the second clock signal CKV2 from an external circuit through the first clock terminal CK1 and the second clock terminal CD2. The second stage SRC2' receives the first sensor driving signal SOUT1 from the first stage SRC1' through the first input terminal IN1', and a third sensor driving signal SOUT3 from the third stage SRC3' through the second input terminal IN2. The second stage SRC2' outputs to the output terminal OUT the second sensor driving signal SOUT2 for selecting the second sensor conductor $S_2$. The second sensor driving signal SOUT2 is also output to the first input terminal IN1 of the third stage SRC3'.

Likewise, the nth stage SRCn' receives the second clock inversion signal CKVB2 and the second clock signal CKV2 supplied from an external circuit through the first clock terminal CK1 and the second clock terminal CK2. The nth stage SRCn' receives the (n−1)th sensor driving signal SOUTn−1 from the (n−1)th stage SRCn−1' through the first input terminal IN1, and the (n+1)th sensor driving signal SOUTn+1 from a dummy stage SRCn+1' through the second input terminal IN2. The nth stage SRCn' outputs to the output terminal OUT a nth sensor driving signal SOUTn for selecting the nth sensor conductor $S_n$. The nth sensor driving signal SOUTn is also output to the first input terminal IN1 of the dummy stage SRCn+1'.

Figure 13:
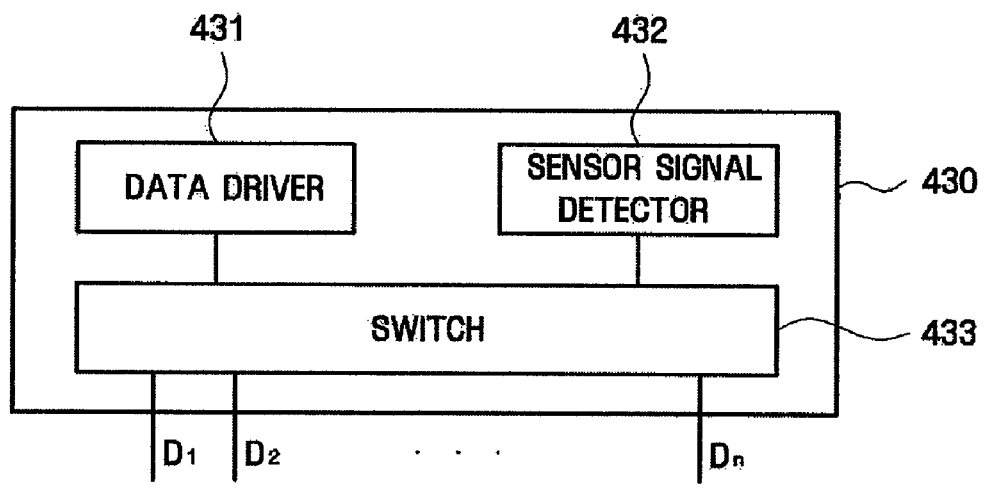
FIG. 13 is a block diagram of an integrated data driver shown in FIG. 10.

Hereinafter, integrated data driver 430 of FIG. 10 will be described in greater detail with reference to FIGS. 10 and 13. FIG. 13 is a block diagram of the integrated data driver shown in FIG. 10.

Integrated data driver 430 includes a data driver 431 applying data voltages corresponding to image signals DATA' to data lines $D_1$-$D_m$, a sensor signal detector 432 detecting sensor driving signals transmitted through the data lines $D_1$-$D_m$, and a switch 433 connecting either the data driver 431 or the sensor signal detector 432 with the data lines $D_1$-$D_m$.

Data driver 431 includes a shift register, a D/A converter, and an output buffer, which are sequentially connected. The shift register latches the image signals DATA' transmitted from the signal controller 440 in synchronization with a rising period of data clock signal HCLK and shifts and stores the latched image signals. Based on a selected gray voltage corresponding to the image signal DATA' transmitted from the shift register, which is in a digital form, the D/A converter converts the digital image signal into an analog data voltage. Upon receiving a load signal LOAD, the output buffer applies the data voltage to each of the pixels of the liquid crystal panel 400.

When external pressure is applied to the liquid crystal panel 400, the sensor conductors $S_1$-$S_n$ and the data lines $D_1$-$D_m$ are electrically connected to each other at the position where the external pressure is applied, and the sensor driving signals generated from the sensor signal generator 420 are applied to sensor signal detector 432 via the sensor conductors $S_1$-$S_n$ and the data lines $D_1$-$D_m$. Then, sensor signal detector 432 detects the position at which the external pressure is applied by sensing the sensor driving signals. In other words, the sensor signal detector 432 identifies the horizontal coordinate of the position at which the external pressure is applied by detecting which one of data lines $D_1$-$D_m$ the sensor driving signals are transmitted through. The sensor driving signals are supplied from sensor signal generator 420 sequentially to the sensor conductors $S_1$-$S_n$. Accordingly, sensor signal detector 432 identifies the vertical coordinate of the position at which the external pressure is applied by detecting the sensing time of each of the sensed sensor driving signals.

When data driver 431 outputs the data driving signals, switch 433 connects data driver 431 with the data lines $D_1$-$D_m$. When the sensor driving signals are transmitted through the data lines $D_1$-$D_m$, switch 433 connects the data lines $D_1$-$D_m$ with sensor signal detector 432. That is to say, when data driver 431 outputs the data driving signals, data driver 431 is connected with the data lines $D_1$-$D_m$ by switch 433 so that the data voltage supplied from data driver 431 is transmitted through the data lines $D_1$-$D_m$ and then charged on the liquid crystal capacitor. When sensor signal generator 420 outputs the sensor driving signals, switch 433 connects sensor signal detector 432 with the data lines $D_1$-$D_m$, so that sensor signal detector 432 senses the sensor driving signals transmitted through the data lines $D_1$-$D_m$, thereby identifying the position at which the external pressure is applied to liquid crystal panel 400.

Figure 14:
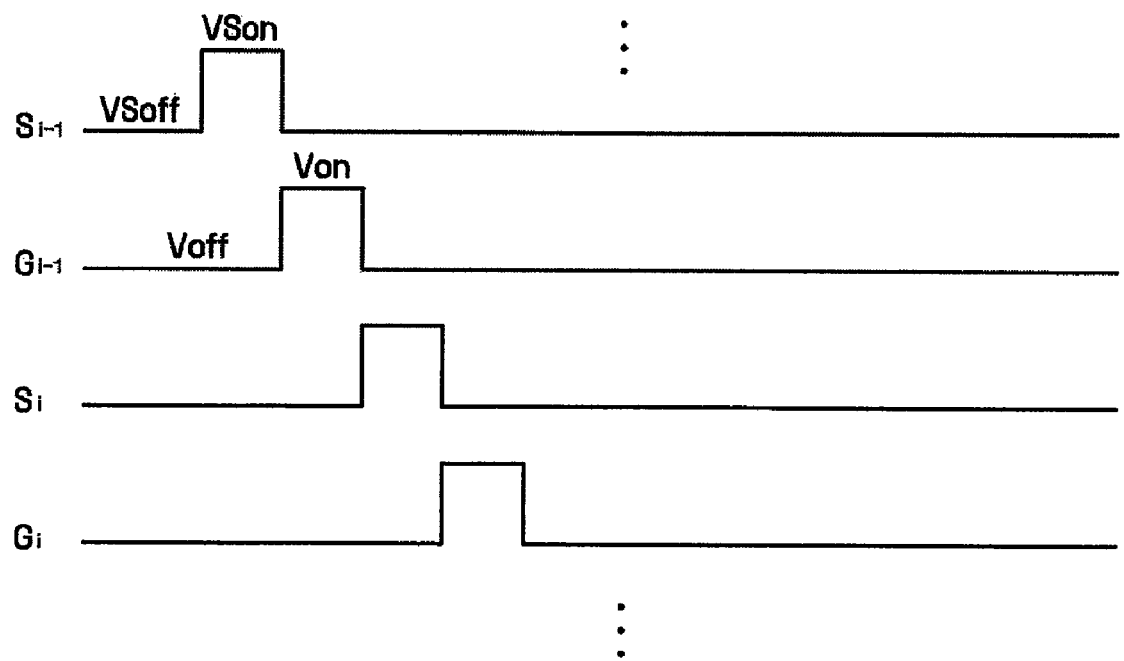
FIG. 14 is a timing diagram illustrating the operation of the touch screen display apparatus shown in FIG. 10.

Hereinafter, a method of driving a touch screen apparatus according to an embodiment of the present invention will be described with reference to FIG. 14, together with FIGS. 10 through 13. FIG. 14 is a timing diagram illustrating the operation of the touch screen display apparatus shown in FIG. 10.

As shown in FIGS. 10 through 14, when the sensor conductors $S_1$-$S_n$ and the gate lines $G_1$-$G_n$ are sequentially arranged and each of the sensor conductors $S_1$-$S_n$ and each of the gate lines $G_1$-$G_n$ are alternately disposed, gate driving signals GOUT1~GOUTn corresponding to the gate lines $G_1$-$G_n$ and sensor driving signals SOUT1~SOUTn corresponding to the sensor conductors $S_1$-$S_n$ are alternately sequentially output to the gate lines $G_1$-$G_n$ and the sensor conductors $S_1$-$S_n$. If the sensor conductors and the gate lines are arranged in an order of $S_1$, $G_1$, $S_2$, $G_2$, . . . , $S_n$, $G_n$, for example, as shown in is FIG. 10, the gate driving signals GOUT1~GOUTn and the sensor driving signals SOUT1~SOUTn are output in an order of SOUT1, GOUT1, SOUT2, GOUT2, . . . , SOUTn, GOUTn.

If a sensor conductor and a gate line are provided at each pixel, as in the current embodiment, a sensor driving signal SOUTi is preferably output prior to a gate driving signal GOUTi. That is to say, the thin film transistor connected to a gate line $G_i$ is turned on by the gate driving signal GOUTi to apply a data voltage to the pixel. Distortion of the data voltage applied to the pixel due to the sensor driving signal SOUTi can be avoided by outputting the sensor driving signal SOUTi prior to the gate driving signal GOUTi.

The method of driving the touch screen apparatus according to an embodiment of the present invention will be described in more detail with reference to FIGS. 10 through 14.

Sensor signal generator 420 which has applied a low-level sensor-off voltage VSoff to the (i−1)th sensor conductor $S_{i-1}$, applies the sensor driving signal SOUTi−1, i.e. , a high-level sensor-on voltage VSon to the (i−1)th sensor conductor $S_{i-1}$, at a predetermined time. When the sensor driving voltage is changed from the sensor-on voltage VSon to the sensor-off voltage VSoff, gate driver 410 applies the gate driving signal GOUTi−1, i.e. , a high-level gate-on voltage Von, to the (i−1)th gate line $G_{i-1}$. While the embodiment shown in FIG. 14 illustrates that the time at which the sensor driving voltage SOUTi−1 applied to the (i−1)th sensor conductor $S_{i-1}$ is changed from the sensor-on voltage VSon to the sensor-off voltage VSoff is the same as the time at which the gate driving voltage GOUTi−1 applied to the (i−1)th gate line $G_{i-1}$ is changed from the gate-off voltage VSoff to the gate-on voltage VSon, the invention is not limited to the illustrated example. That is to say, as long as the (i−1)th sensor driving voltage SOUTi−1 is output prior to the (i−1)th gate driving voltage GOUTi−1, the time at which the sensor driving voltage is changed may not be identical with the time at which the gate driving voltage is changed.

The sensor signal generator 420 applies the sensor driving signal SOUTi, i.e., the sensor-on voltage VSon, to the ith sensor conductor $S_i$ at a time when the gate driving voltage is changed from the gate-on voltage VSon to the gate-off voltage VSoff. While the current embodiment illustrates that the time at which the gate driving voltage GOUTi−1 applied to the (i−1)th gate line $G_{i-1}$ is changed from the gate-on voltage VSon to the gate-off voltage VSoff is the same as the time at which the sensor driving voltage SOUTi applied to the ith sensor conductor $S_i$ is changed from the sensor-off voltage VSoff to the sensor-on voltage VSon, the invention is not limited to the illustrated example. That is to say, as long as the (i−1)th gate driving voltage GOUTi−1 is output prior to the ith sensor driving voltage SOUTi, the time at which the sensor driving voltage is changed may not be identical with the time at which the gate driving voltage is changed.

Figure 15:
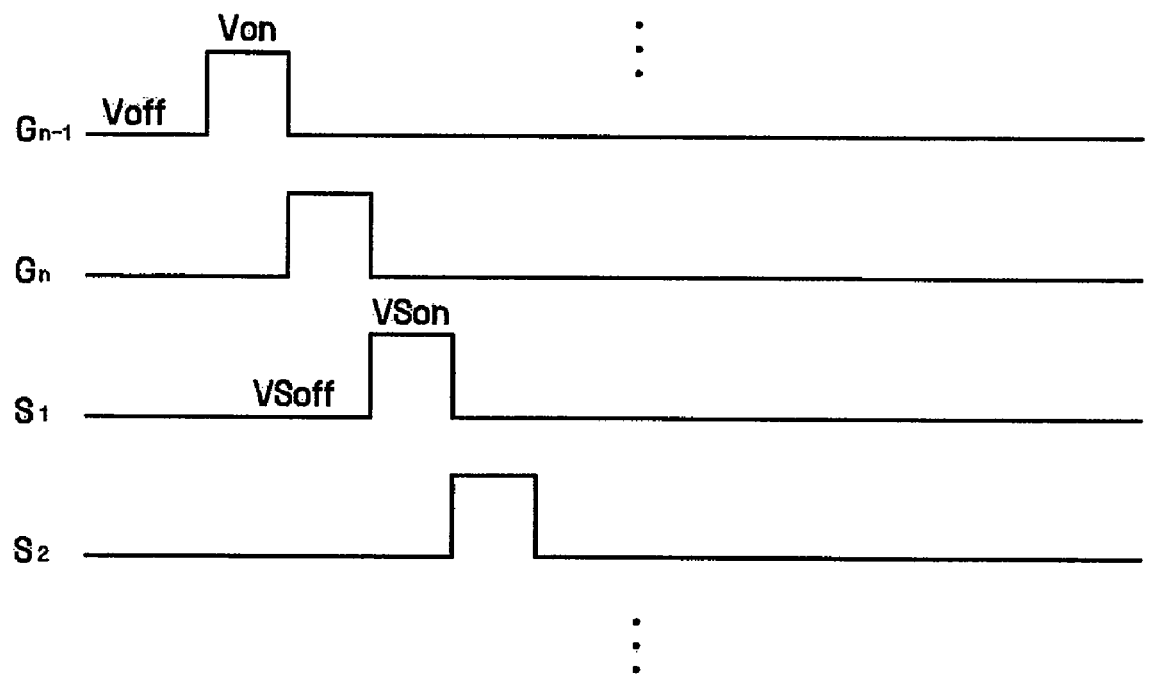
FIG. 15 is a timing diagram illustrating a modified example of the operation shown in FIG. 14.

FIG. 15 is a timing diagram illustrating a modified example of the operation shown in FIG. 14.

As shown in FIG. 15, after the gate driving signals GOUT1~GOUTn are sequentially output to the gate lines $G_1$-$G_n$, the sensor driving signals SOUT1~SOUTn are sequentially output to the sensor conductors $S_1$-$S_n$. When the time period during which a data voltage is applied to all pixels constituting a picture displayed is referred to as a frame, a blank period exists between frames. Accordingly, after the gate driving signals GOUT1~GOUTn are output to the gate lines $G_1$-$G_n$ so that the data voltage is applied to all the pixels during one time period, the sensor driving signals SOUT1~SOUTn are sequentially output to the sensor conductors $S_1$-$S_n$, during the blank period.

Figure 16:
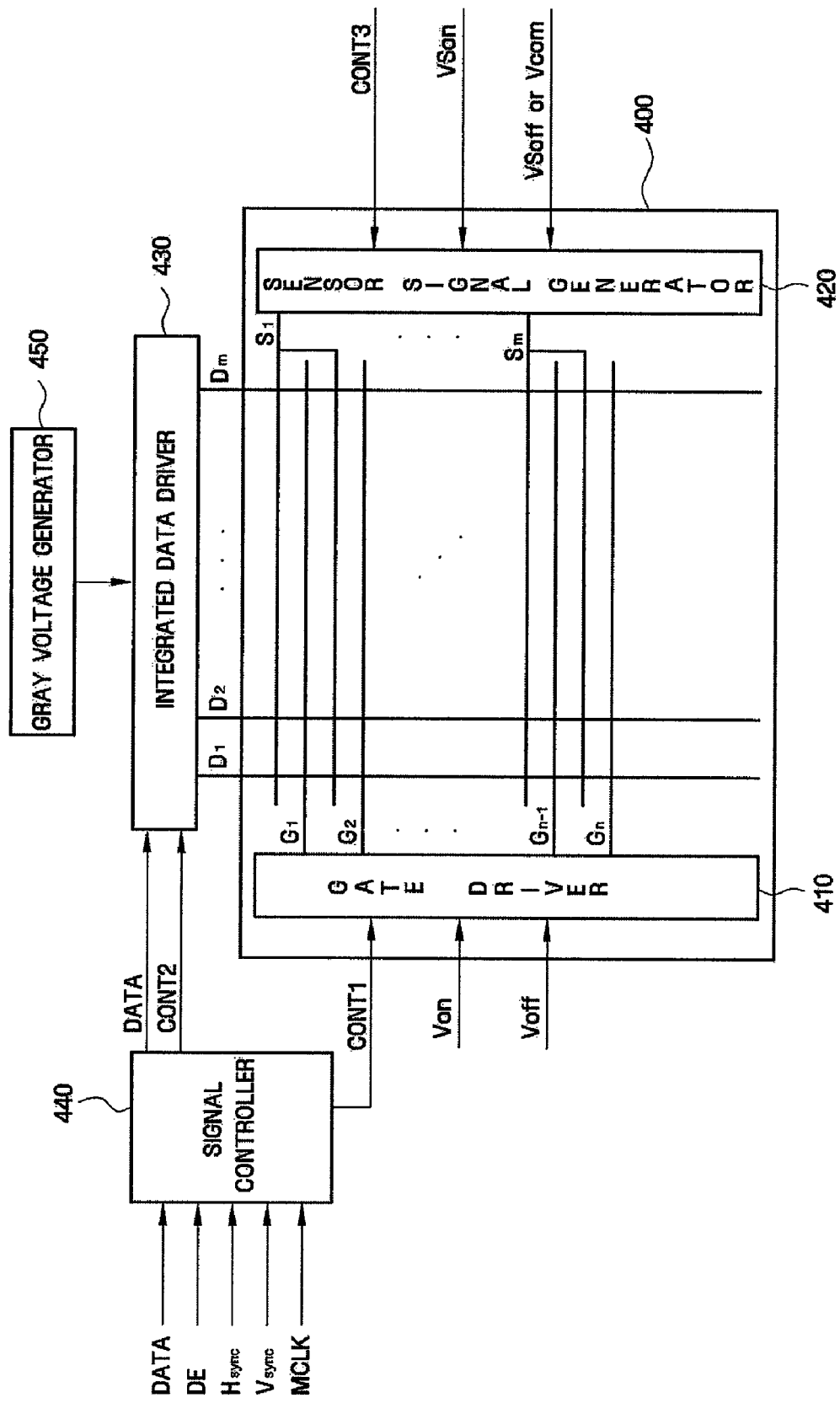
FIG. 16 is a block diagram of the touch screen display apparatus according to a further embodiment of the present invention.
Figure 17:
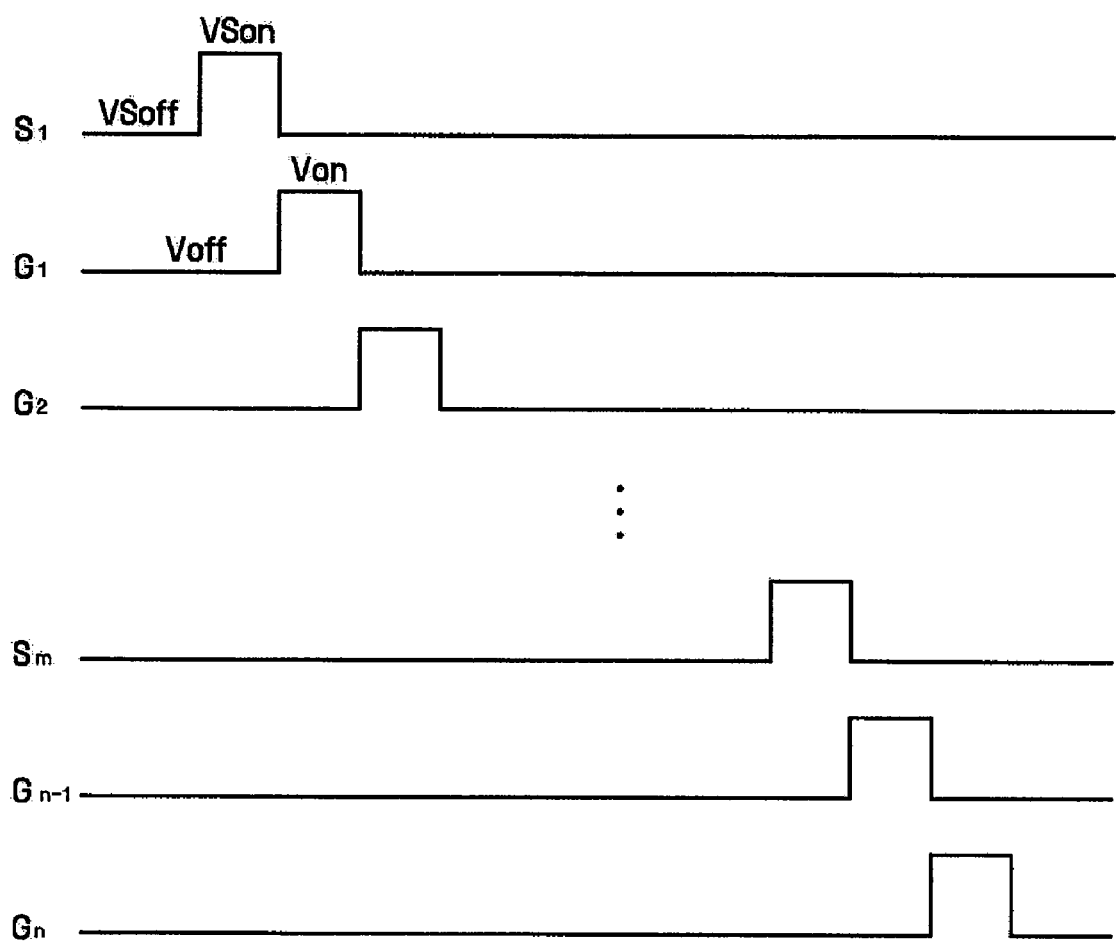
FIG. 17 is a timing diagram illustrating the operation of the touch screen display apparatus shown in FIG. 16.

FIG. 16 is a block diagram of the touch screen display apparatus according to a further embodiment of the present invention, FIG. 17 is a timing diagram illustrating the operation of the touch screen display apparatus shown in FIG. 16, and FIG. 18 is a timing diagram illustrating a modified example of the operation shown in FIG. 17. For convenience of explanation, components having the same function previously described in the embodiments shown in FIGS. 10 through 15 are respectively identified by the same reference numerals, and their repetitive description will be omitted. As shown in FIGS. 16 through 18, the touch screen display apparatus according to the current embodiment of the present invention has substantially the same structure as that shown in FIGS. 10 through 15 except for the following.

The sensor conductors $S_1$-$S_m$ shown in FIG. 16 are at least two among the sensor conductors $S_1$-$S_n$ shown in FIG. 10, which are electrically connected in sequence to each other, so that the same sensor driving signal is applied thereto.

In other words, as shown in FIG. 16, the sensor conductors $S_1$-$S_m$, which are connected to the sensor signal generator 420 and separated therefrom in forms of branches, extend in a row direction over a plurality of pixels. That is to say, since a sensor conductor is formed in a pixel row group consisting of a plurality of pixel rows, the sensor driving signal supplied from the sensor signal generator 420 can also be applied to the pixel row group, thereby reducing a driving time for touch screen sensing.

While the current embodiment illustrates that one among the sensor conductors $S_1$-$S_m$ is formed in a pixel row group consisting of two pixel rows, the invention is not limited the particularly specified number of pixel rows forming a pixel row group. In addition, although not shown, the sensor conductors $S_1$-$S_m$ may be formed only on one among the pixel rows forming a pixel row group. In the following description, for convenience of explanation, the invention will be described with regard to the sensor conductors $S_1$-$S_m$ formed in the pixel row group consisting of two pixel rows.

Referring to FIG. 17, after the first sensor driving signal SOUT1 is applied to the first sensor conductor $S_1$ formed in the first pixel row group consisting of a plurality of pixel rows, gate driving signals GOUT1 and GOUT2 are sequentially applied to the first gate line $G_1$ and the second gate line $G_2$ included in the first pixel row group. Next, after the second sensor driving signal SOUT2 is applied to the second sensor conductor $S_2$, gate driving signals GOUT3 and GOUT4 are sequentially applied to the third gate line $G_3$ and the fourth gate line $G_4$ included in the second pixel row group.

FIG. 18 is a timing diagram illustrating a modified example of the operation shown in FIG. 17.

As shown in FIG. 18, after the gate driving signals GOUT1~GOUTn are sequentially output to the gate lines $G_1$-$G_n$, the sensor driving signals SOUT1~SOUTm are sequentially output to the sensor conductors $S_1$-$S_m$. When a time period in which a data voltage is applied to all pixels constituting a picture displayed is referred to as a frame, a blank period exists between frames.

Accordingly, after the gate driving signals GOUT1~GOUTn are output to the gate lines $G_1$-$G_n$ so that a data voltage is applied to all the pixels during one time period, the sensor driving signals SOUT1~SOUTm are sequentially output to the sensor conductors $S_1$-$S_m$ during the blank period. In such a manner, the sensor conductors to which the same sensor driving signal are applied are formed for each pixel row group consisting of a plurality of pixel rows, thereby reducing a driving time for touch screen sensing.

As described above, according to the present invention, since the touch screen sensor is formed in a liquid crystal panel, a touch screen display apparatus that is light in weight and small in size is achieved.

In addition, the touch screen display apparatus of the invention does not reduce luminance since the data lines also serve as longitudinal conductors of the touch sensor.

Further, a touch screen display apparatus that is simple in structure avoids reduction of luminance because the storage conductors also serve as transverse conductor of the touch screen sensor. While the present invention has been particularly shown and described with reference to exemplary embodiments thereof, it will be understood by those of ordinary skill in the art that various changes in form and details may be made therein without departing from the spirit and scope of the present invention.

What is claimed is:

1. A touch screen display apparatus comprising:
   a first transparent substrate;
   a gate line and a sensor conductor formed on the first transparent substrate;
   a data line insulated from and intersecting the gate line and sensor conductor;
   a second transparent substrate facing the first transparent substrate;
   a sensor electrode formed on the second transparent substrate so as to correspond to an intersection of the sensor conductor and the data line, the sensor electrode electrically connecting the sensor conductor with the data line when acted upon by an external pressure,
   a passivation layer formed on the sensor conductor and the data line and having first and second contact holes partially exposing the sensor conductor and the data line, respectively;
   first and second electrode pads formed on the passivation layer to be connected with the sensor conductor and the data line through the first and second contact holes, respectively; and
   a planarization pattern formed between the first electrode pad and the first transparent substrate for the purpose of flattening the surface of the first electrode pad and the surface of the second electrode pad, wherein the passivation layer is made of an insulating material; and
   wherein the planarization pattern is made of the same material on the same plane as the data line.

2. The touch screen display apparatus of claim 1, wherein the sensor electrode is connected with the first and second electrode pads when an external pressure is applied.

3. The touch screen display apparatus of claim 1, wherein the passivation layer includes a third contact hole for connecting the planarization pattern with the first electrode pad.

4. The touch screen display apparatus of claim 1, wherein at least two of red, green, and blue color filters overlapping each other are disposed between the second transparent substrate and the sensor conductor.

5. The touch screen display apparatus of claim 1, wherein a sensor spacer having a height less than that of a cell gap between the first transparent substrate and the second transparent substrate is formed between the second transparent substrate and the sensor conductor.

6. The touch screen display apparatus of claim 1, wherein a blue pixel is defined by an intersection of the gate line and the data line.

7. The touch screen display apparatus of claim 1, wherein the sensor conductor is implemented by a storage conductor, and a common voltage and a sensor voltage for touch screen driving are alternately applied to the sensor conductor.

* * * * *